United States Patent [19]
Van Don

[11] 4,226,605
[45] Oct. 7, 1980

[54] FLAMELESS VAPORIZER

[75] Inventor: Frank Van Don, Fountain Valley, Calif.

[73] Assignee: Airco, Inc., Montvale, N.J.

[21] Appl. No.: 953,994

[22] Filed: Oct. 23, 1978

[51] Int. Cl.³ .............................................. F17C 7/02
[52] U.S. Cl. ..................................... 62/52; 126/19.5; 62/323
[58] Field of Search ..................... 126/19.5; 62/238 E, 62/323 R, 52, 53

[56] References Cited

U.S. PATENT DOCUMENTS

| | | | |
|---|---|---|---|
| 2,359,219 | 9/1944 | Jones | 62/52 |
| 3,058,317 | 10/1962 | Putman | 62/52 |
| 3,100,528 | 8/1963 | Plummer et al. | 62/53 |
| 3,124,940 | 3/1964 | Guelton | 62/52 |
| 3,229,472 | 1/1966 | Beers | 62/53 |
| 3,662,561 | 5/1972 | Schroeder | 62/52 |
| 3,672,446 | 1/1972 | Tibbetts et al. | 165/183 |
| 3,823,568 | 7/1974 | Bijasiewiez | 62/52 |
| 4,003,139 | 1/1977 | Van Winkle | 126/19.5 |

FOREIGN PATENT DOCUMENTS

2002057  2/1979  United Kingdom .

*Primary Examiner*—Ronald C. Capossela

*Attorney, Agent, or Firm*—Roger M. Rathbun; Edmund W. Bopp; Larry R. Cassett

[57] ABSTRACT

A liquid-vapor converter of a compact skid-mounted design is provided that efficiently converts a cryogenic liquid into a vapor, and which includes, in the same skid mounting, all necessary components necessary to receive the liquid and to provide therefrom a high pressure source of gas, particularly for use in recovery of product from oil wells. The design includes an internal combustion engine as a motive force to drive the main pump for pressurizing the vapor for its intended use. A heat exchanger receives the liquid and circulates the same through tubing, where the liquid is vaporized in the heat exchanger by ambient air being passed across the tubing to warm the liquid, thus effecting such vaporization. The heat exchanger utilizes heat from the engine exhaust to preheat the incoming ambient air prior to its passing in heat transfer relationship across the tubing. In addition, further heat may be provided to the incoming ambient air by positioning the engine radiator and/or the hydraulic oil cooler in the ambient air stream inlet. The overall converter is particularly adapted for use in oil well drilling locations where extreme care must be taken to avoid open flame or fires, such as off-shore drilling rigs.

9 Claims, 3 Drawing Figures

FLAMELESS VAPORIZER

BACKGROUND OF INVENTION

Converters or vaporizers are widely used in various fields to convert cryogenic liquids to gases. Typical of such liquids are $O_2$ and $N_2$ which are normally in the gas state at ambient conditions so that certain vaporizers are able to utilize no more than ambient air to supply sufficient heat to vaporize the liquid. The advantage of dealing with cryogenic liquids is, of course, well known since in the liquid state, the product can be stored, transported, pumped, etc. to the final use site and then vaporized to yield extremely large volumes of gas.

One particular use of such vaporizers, and the one to which this invention is particularly suitable, is for the introduction of an inert gas at high pressure into oil wells for fracing or other treatment. Such uses of high pressure inert gases are shown in Plummer U.S. Pat. No. 3,100,528 and one of the preferred gases for oil well treatment is nitrogen ($GN_2$).

A typical commercial unit for supplying $GN_2$ may be provided in the form of a trailer truck which includes the $LN_2$ storage container, a converter to convert the $LN_2$ into gaseous $GN_2$ and associated pumping means to pressurize the gaseous $GN_2$ for introduction into the oil well. The motive power to operate the pumping equipment may be an internal combustion engine, such as a diesel engine, or may include a gas turbine. In any case, such motive power is also mounted on the trailer truck itself so that the entire unit for providing high pressure $GN_2$ can be readily transported to the site of the oil well and is mobile to be moved to another location when that particular treatment is completed.

Vaporizers generally may be of the ambient air type, see U.S. Pat. No. 3,672,446 of Tibbets et al, or may have some source of additional heat for vaporization supplied from means such as a gas fired burner, or even by passing engine exhaust directly upon the tube containing the liquid to be vaporized. The need for additional heat depends upon the particular application, i.e. flow of gas desired and the typical ambient conditions.

Ambient air vaporizers, which are suitable for certain types of uses, are generally slow means of vaporization and, of course, are dependent substantially upon the temperature of the ambient air. In addition, the size of the heat transfer area must be extremely large so that the maximum amount of ambient air may contact the heat transfer surface to thus give up heat to the cryogenic liquid flowing through pipes or tubing. Therefore, a large area on location must be available for such vaporizers, thus the ambient air type of vaporizer is unsuitable in locations where space is at a premium, particularly when it is desirable to move the vaporizer from one location to another. Those vaporizers utilizing some heating means include fuel-fired combustion chambers which pass the hot products of combustion over tubing containing the cryogenic liquid to be vaporized. One difficulty with fuel-fired vaporizers is, however, the danger associated with fire or open flame. The danger is especially acute in off-shore oil rigs due to the inaccessibility of the installation.

SUMMARY OF INVENTION

The vaporizer of this invention is used in connection with motive means, such as a diesel engine and includes associated equipment to provide a compact, skid-mounted, self-contained $LN_2$ converter which can be easily transported to a location and, due to its compact size, can readily even be air lifted by helicopter to any desired location, such as off-shore oil rigs.

The compactness is due to the unique use of heat from various components of the internal combustion engine to preheat ambient air which is then circulated through the vaporizer heat exchanger to warm the $LN_2$ to effect vaporization thereof.

As a feature of the vaporizer, the exhaust pipes from the internal combustion engine are located such as to pass through an inlet chamber where the ambient air enters the heat exchanger. Thus, heat, normally lost to the atmosphere, is confined and utilized to warm the incoming ambient air to enhance vaporization of the liquid.

Further components of the internal combustion engine can also be located in the ambient air inlet to obtain heat from such components. Specifically, the engine radiator is positionable in such inlet and even the hydraulic oil cooler can be so positioned.

The effect of deriving such normally lost heat serves to compact the overall unit such that a reduction in size and weight is realized without decreasing the unit's capacity.

Since the heat derived is essentially from flameless sources, the fire hazard is virtually eliminated and, therefore, the compact size enabled by this invention, combined with its flameless characteristics produce an ideal unit that can be skid-mounted and easily air-lifted to off-shore oil drilling rigs for introducing nitrogen into the oil wells.

BRIEF DESCRIPTION OF THE DRAWINGS

The invention is diagrammatically illustrated by way of example in the drawings appended hereto, in which.

DESCRIPTION OF THE PREFERRED EMBODIMENT

Figure 1:
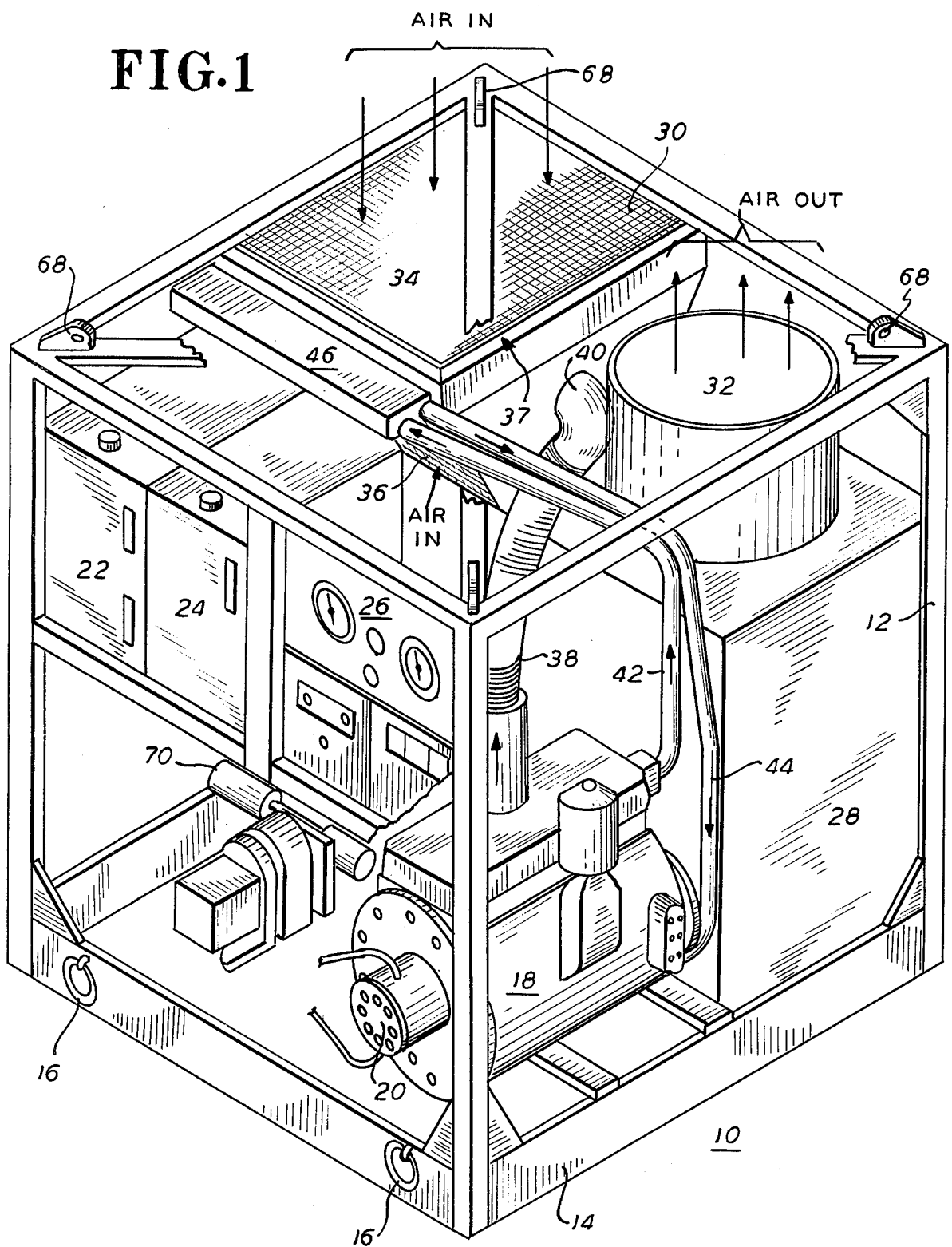
FIG. 1 is an isometric view of the overall invention as assembled and skid-mounted.

In FIG. 1, there is shown an isometric view of the flameless $LN_2$ vaporizer constructed in accordance with the present invention. The overall vaporizer 10 is encased in a metal frame 12 and is mounted on a base 14 including tie-down rings 16 and lifting lugs 68 such that, as will be explained, the entire unit is skid-mounted and can be readily hoisted or moved by various means to move the unit from one location to another. The mounting particularly facilitates the use of a helicopter lift to deliver the unit to off-shore drilling rigs.

The basic vaporizer 10 includes a motive force to operate the pump which pressurizes nitrogen for introduction into the oil well. In the preferred embodiment, the motive force comprises a diesel engine 18 having a hydraulic pump 20 attached to the motor shaft which operates a hydraulic driven cryogenic pump 70 which pressurizes the liquid nitrogen. Suitable tanks 22 and 24 are included to contain respectively, fuel oil for the diesel engine 18 and hydraulic oil for various of the operating hydraulic valves and the pump 70. A conventional control panel 26 is located for convenient viewing and accessibility by an operator.

The heat exchanger where air is passed over tubes containing the LN₂ to be vaporized (not shown in FIG. 1) comprises a chamber housing 28 also mounted upon the base 14. The chamber housing 28 has a main air inlet 30 where ambient air is induced into the heat exchanger and an air outlet 32 where the air leaves the heat exchanger. As shown, the main air inlet 30 actually receives ambient air through openings 34 and 36, the purpose for which will be later explained.

As shown, with respect to the diesel engine 18, there is an exhaust tubing 38 which carries the hot exhaust gases from engine 18 and which connects to the heat exchanger housing 28 at 40. Also, the cooling water used for cooling engine 18 is circulated via hose 42 which carries the hot water away from engine 18 and hose 44 which returns the then cooled water to engine 18. The engine radiator, not shown in FIG. 1, receives the water from hose 42 and returns it via hose 44 after cooling the water. The radiator is basically of conventional design, however, it is located within the inlet 30 of the heat exchanger housing 28 through manifold 46. Also located in inlet 30 is the hydraulic oil cooler 37 which serves to cool hydraulic oil used for the aforedescribed purposes in the system.

Figure 2:
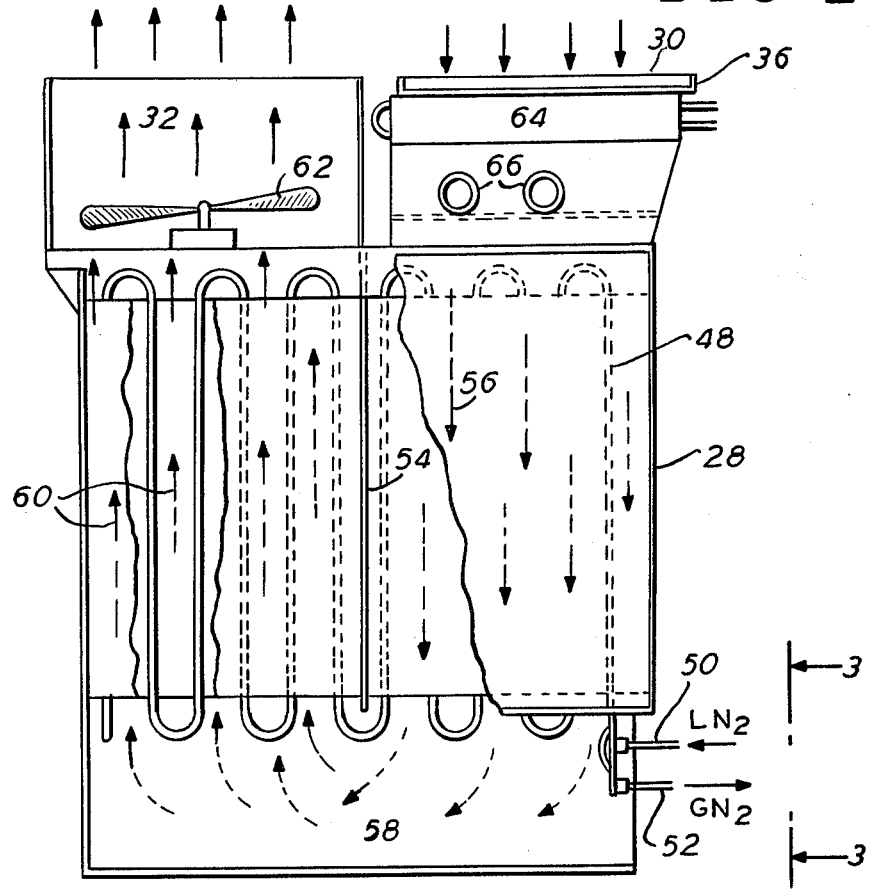
FIG. 2 is a lateral cross-sectional view showing the air flow through the invention.
Figure 3:
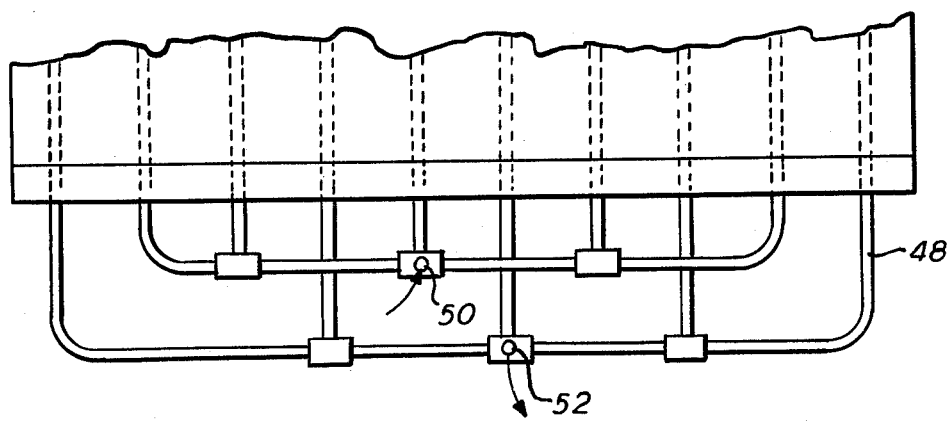
FIG. 3 is a detailed, enlarged view of a portion of the invention taken at the arrows 3—3 of FIG. 2.

Turning now to FIGS. 2 and 3, there is shown, in more detail, the purpose for the particular exhaust system, radiator system and hydraulic oil cooler system employed in this invention. The air inlet 30 to the heat exchanger chamber housing 28 allows induced ambient air into the heat exchanger and which passes over coils 48 containing the LN₂ to be vaporized. A suitable inlet 50 is provided for introducing LN₂ from the pump 70 into the coils 48 and an outlet 52 allows the removal of GN₂ for introduction into the oil well.

The chamber housing 28 is divided by means of a partition 54 into two separate passages for directing the air over coils 48. As shown in FIG. 2, the air initially enters chamber housing 28 downwardly as depicted by arrows 56, through a lower chamber 58 and thence upwardly, shown by arrows 60 to an outlet 32. Thus, the heat exchanger, where the LN₂ is warmed by the air, is compacted into a fairly small compartment, yet the air is allowed as much contact with the coils 48 as possible to give up sufficient heat for vaporization.

A fan 62 is located in the air outlet 32 and which induces the flow of air from the air inlet 30 to the outlet 32; the fan 62 itself may be conveniently powered by hydraulic means operating off fluid from hydraulic pump 20 rotated by diesel engine 18.

In the air inlet 30, there is positioned the engine radiator 64 which connects to the hoses 42 and 44 of FIG. 1 and which serves to cool the engine circulating water in conventional manner, yet additionally serves to heat the outside ambient air so that the air can provide additional heat for vaporizing the LN₂ in coils 48. Also, air is drawn across hydraulic oil cooler 37 to add heat to heat exchanger 28 and at the same time cool the hydraulic oil used in the system.

In addition, the engine exhaust is passed through the air inlet 30, shown as conduits 66 and which gives up heat from the hot exhaust gases to also provide additional heat to the incoming ambient air for vaporizing the LN₂. As shown in FIG. 2, the exhaust conduits 66 are described for a dual exhaust system, however, the use of a single or multiple exhaust pipes are certainly equally applicable, depending upon the engine size and heat requirements.

By the above means, the overall vaporizer is compact, skid-mounted and yet provides sufficient vaporized nitrogen for oil well application, without relying upon an outside source of heat such as by flame, by utilizing the exhaust heat from the diesel engine normally used for providing power for the nitrogen pumping and also utilizing, for optimum heat transfer, the diesel engine radiator and oil cooler positioned within the heat exchanger inlet to gain additional heat from the circulating water and hydraulic oil while still acting as a normal radiator, and hydraulic oil coolers for the engine. Thus the compactness is optimized without sacrificing heat exchange capacity and the unit small enough for ready installation on-site and for transport thereto and therefrom.

As a specific example of a skid-mounted vaporizer for oil well application, a forced air vaporizer can be produced utilizing a 3-GMPD nitrogen pump operating at a speed up to 1200 rpm with flow of 75-1000 SCFM of nitrogen produced at pressures up to 10,000 psig. The discharge N₂ gas temperature is about at ambient, and the entire unit only about eight feet long, by six feet wide and seven feet 4 inches high with an estimated weight of 8800 lbs. The unit is thus sufficiently compact to be readily air-lifted yet produces a sufficient flow of high pressure nitrogen for oil well treatment.

While the present invention has been particularly set forth in terms of specific embodiments thereof, it will be understood in view of the present disclosure, that numerous variations upon the invention are now enabled to those skilled in the art, which variations yet reside within the scope of the teaching. Accordingly, the invention is to be broadly construed and limited only by the scope and spirit of the claims now appended hereto.

I claim:

1. A compact, self-contained ambient air vaporizer in combination with an internal combustion engine having a radiator and an exhaust system, and pumping means operated by said internal combustion engine, said vaporizer comprising a heat exchanger having an ambient air inlet chamber and an outlet chamber, means to pass ambient air in a path from said inlet chamber to said outlet chamber, tubing means within said heat exchanger and located in the path of said ambient air, said tubing means adapted to receive liquid cryogenic substance from said pumping means, said ambient air providing heat to said cryogenic substance to warm said substance for conversion to a gas, and heating means comprising said internal combustion engine radiator in the inlet chamber of said heat exchanger, said heating means adapted to transfer heat derived from said internal combustion engine to warm the ambient air entering said inlet chamber.

2. An ambient air vaporizer as described in claim 1 wherein said heating means further comprises at least a part of said internal combustion engine exhaust system.

3. An ambient air vaporizer as described in claim 1 wherein said heating means comprises said internal combustion engine radiator and at least a part of said engine exhaust system.

4. An ambient air vaporizer as described in claim 1 wherein said heat exchanger provides multiple passes of said ambient air to provide heat to said cryogenic substance.

5. An ambient air vaporizer as described in claims 1, 2, 3 or 4 wherein said liquid cryogenic substance is liquid nitrogen.

6. A compact, skid-mounted ambient air vaporizer for converting liquid cryogenic substance into a high pressure gas, said vaporizer comprising a frame, an internal combustion engine mounted on said frame, said internal combustion engine having associated therewith a radiator and an exhaust system, pumping means mounted on said frame and a heat exchanger mounted on said frame, said heat exchanger containing tubing having an inlet for receiving the liquid cryogenic substance and an outlet for discharging the gas converted from said liquid cryogenic substance, said heat exchanger further having a path therethrough for passing air in heat exchange relationship with said tubing, said path having an ambient air inlet chamber and an air outlet, said ambient air inlet having contained therein heating means comprising said internal combustion engine radiator to utilize heat derived from said internal combustion engine to provide heat to said ambient air passing through said inlet chamber and means to cause said air to flow from said inlet along said path to said outlet thereby warming said liquid cryogenic substance to convert said liquid substance to a gaseous form, said pumping means adapted to receive and pressurize the liquid nitrogen to a predetermined high pressure for introduction thereof into said heat exchanger inlet.

7. An ambient air vaporizer as described in claim 6 wherein said heating means further comprises at least a part of said internal combustion engine exhaust system.

8. An ambient air vaporizer as described in claim 6 wherein said heating means comprises said internal combustion engine radiator and at least a part of said engine exhaust system.

9. A compact, skid-mounted ambient air vaporizer for converting liquid nitrogen into a high pressure gas suitable for introduction into an oil well for product recovery, said vaporizer comprising:
   a. a frame,
   b. an internal combustion engine mounted to said frame, said internal combustion engine having a radiator and exhaust piping,
   c. hydraulic oil pump means operable by said internal combustion engine to supply hydraulic oil under pressure,
   d. a heat exchanger mounted to said frame, said heat exchanger comprising an elongated tubing having an inlet for receiving liquid nitrogen and an outlet for delivering gaseous nitrogen, said heat exchanger forming a path to carry ambient air in heat conducting relationship with said tubing, said path having an inlet chamber and an outlet, heating means in said inlet chamber, said heating means including said internal combustion engine radiator to heat the ambient air passing through said inlet chamber, said heating means further including a hydraulic oil cooler means adapted to cool the hydraulic oil from said hydraulic oil pump thereby deriving heat from such hydraulic oil to further heat the ambient air in said inlet chamber, and
   e. pumping means mounted to said frame adapted to receive liquid nitrogen for pressurizing the nitrogen for delivery to said heat exchanger.

* * * * *